United States Patent [19]

Rubel

[11] Patent Number: 4,850,461
[45] Date of Patent: Jul. 25, 1989

[54] SHOCK ABSORBER HAVING A THROTTLE WITH A VARIABLE CROSS SECTION

[75] Inventor: Erich Rubel, Ludwigsburg, Fed. Rep. of Germany

[73] Assignee: Robert Bosch GmbH, Stuttgart, Fed. Rep. of Germany

[21] Appl. No.: 207,474

[22] Filed: Jun. 16, 1988

[30] Foreign Application Priority Data

Jul. 22, 1987 [DE] Fed. Rep. of Germany ....... 3724271

[51] Int. Cl.$^4$ ............................ F16F 9/06; F16F 9/34; B60G 11/26
[52] U.S. Cl. ............................... 188/319; 188/322.15; 280/708; 280/714
[58] Field of Search ............... 188/299, 319, 279, 282, 188/314, 316, 322.15, 322.22; 267/64.16, 34, 64.28; 280/707, 714, 708

[56] References Cited

U.S. PATENT DOCUMENTS

| 2,035,954 | 3/1936 | Focht ................................. 188/314 |
| 3,694,111 | 9/1972 | Braun ................................ 267/64.28 |
| 4,465,299 | 8/1984 | Stone et al. ..................... 188/299 X |
| 4,478,431 | 10/1984 | Muller et al. ................... 280/714 X |
| 4,732,408 | 3/1988 | Ohlin ............................... 188/319 X |

FOREIGN PATENT DOCUMENTS

| 1655647 | 8/1971 | Fed. Rep. of Germany . |
| 0183306 | 10/1983 | Japan .............................. 188/322.15 |
| 0050817 | 3/1986 | Japan ................................... 188/299 |
| 2003255 | 3/1979 | United Kingdom . |

Primary Examiner—Robert J. Oberleitner
Attorney, Agent, or Firm—Edwin E. Greigg

[57] ABSTRACT

A damping device having a regulatable shock absorber functioning both passively and actively is proposed. The adjustment of the shock absorber is effected by the actuation of a control device, the deflection of which is varied by the control pressure in a control line. Depending upon the deflection of the control device, the shock absorber functions as a passive or an active damper. In passive damping, the size of the throttle cross sections between work chambers of the shock absorber is controlled. In active damping, damping fluid is delivered to or removed from one of the work chambers via the control line. The pump capacity necessary for bringing the control pressure to bear is designed to be so low that compensation for the internal friction in the damping device or in a vehicle suspension is assured. The components necessary for adjusting the control pressure can therefore be kept quite small in size, and in particular a low-capacity compression pump can be used.

8 Claims, 2 Drawing Sheets

SHOCK ABSORBER HAVING A THROTTLE WITH A VARIABLE CROSS SECTION

BACKGROUND OF THE INVENTION

The invention is directed to improvements in damping devices including an hydraulic shock absorber.

A damping device is already known (German Offenlegungsschrift No. 16 55 647), which is connected to a regulating device located outside a shock abosrber. By means of the regulating device, a variable control pressure is generated that acts upon a control device disposed inside the shock absorber affecting the throttle cross sections that are definitive for the damping. The side of the control device not exposed to the control pressure is acted upon by both the force of a compression spring and the pressure of one of the work chambers of the shock absorber. Parallel to the throttle cross section monitored by the control device, the two work chambers of the shock absorber are also connected to one another by further connecting conduits, which are provided with check valves. The known device permits adjustment of the shock absorber characteristic curve even during driving.

From German Offenlegungsschrift No. 27 38 455 or Great Britain Pat. No. 2 003 255, an active damping system is known which has a high-pressure pump, a high-pressure reservoir and metering valves for controlling the pressure in the work chambers. Since this is a vehicle damping system that functions only actively, all the components must be designed for very high capacity (up to 5 kW per wheel), which makes such a damping system very expensive, and uneconomical for common vehicles.

However, active dampers do have economic advantages in cases in which only little capacity is needed. This is less pertinent to high damping values than to applications of a damper in which, above all, it is the internal friction inside the vehicle/suspension/damping system that predominates. This is especially true for driving over good roads. Here a low-capacity but fast-response active damping can offer a notably more comfortable ride than is provided by purely passive damping.

OBJECT AND SUMMARY OF THE INVENTION

It is an object of the damping device according to the invention to provide the advantage over the prior art of achieving an active damping that needs only a small pump capacity, yet which is sufficient to compensate for the internal friction of a suspension/damping system. The damping device functions both passively and actively, and the control is performed by actuating a single valve device.

It is another object to provide a damping device having a lightweight pump of small capacity, with thin lines and a small and lightweight valve device requiring little electric current.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
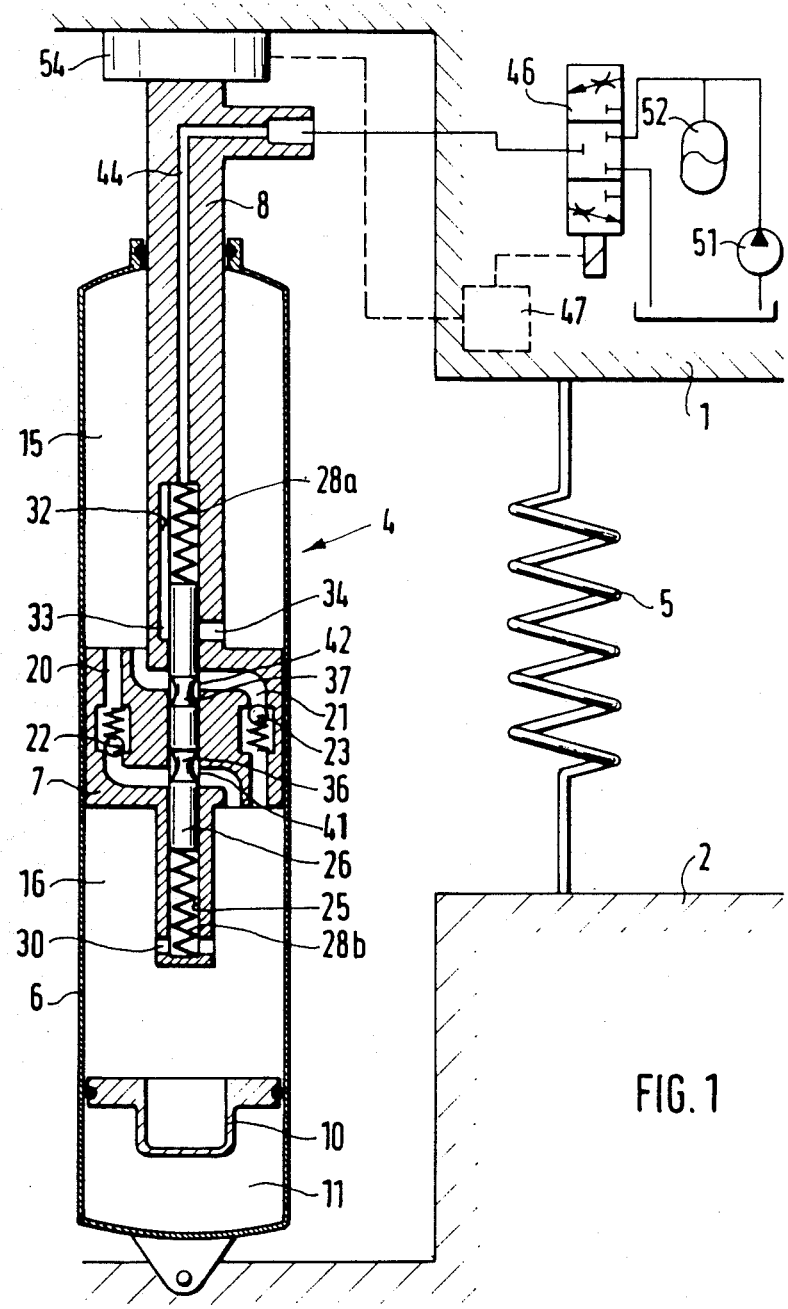
FIG. 1 shows a damping device, primarily comprising a shock absorber and a control device.

The damping device shown in FIG. 1 includes, among other elements, a shock abosrber 4, disposed between a vehicle body 1 and a vehicle axle 2, and a spring 5 parallel to the shock absorber 4. The shock absorber 4 has a damping piston 7, which is guided inside a jacket tube 6 and is firmly joined to a piston rod 8 protruding from the jacket tube 6. The shock absorber 4 is in the form of a so-called single-tube shock absorber, and is therefore provided on its underside with a gas volume 11, closed off by a movable partition 10 and serving to furnish volumetric compsensation for the piston rod 8 as it moves in and out. The invention is not limited to a single-tube shock absorber, however, but is equally applicable to a dualtube shock absorber.

The damping piston 7 divides the interior of the shock absorber 4 into a first work chamber 15 and a second work chamber 16. Two connecting conduits 20, 21 connect the work chambers 15, 16 to one another, and check valves 22, 23, permitting a flow in only one direction, are located in the connecting conduits 20, 21. A flow through the first connecting conduit 20 is possible via the first check valve 22 only from the second work chamber 16 into the first work chamber 15; a flow through the second connecting conduit 21 via the second check valve 23 is possible only from the first work chamber 15 into the second work chamber 16.

Located inside the damping piston 7 or the piston rod 8 is a guide bore 25, extending axially, for instance, in which a control device embodied as a cylindrical control slide 26 can slide axially. Each of the face ends of the control slide 26 is engaged by a respective spring 28a, 28b. With their other respective ends, the springs 28a, 28b rest on opposite end walls of the guide bore disposed inside the damping piston or piston rod 8. The springs 28a, 28b are preferably embodied as helical springs and occupy the part of the interior of the guide bore 25 that is not filled by the control slide 26.

The portion of the guide bore 25 located below the control slide 26 and receiving the spring 28b communicates in an unthrottled manner with the second work chamber 16, via openings 30. The space in the guide bore 25 located above the control slide 26 is accompanied, over a portion of its length, by an axially extending groove 32. Opposite a lower end 33 of the groove 32, a connecting opening 34 discharges into the guide bore 25; this connecting opening 34 opens on its other end into the first work chamber 15. The cylindrical control slide 26 has a lower first restriction 36 and an upper second restriction 37, the diameters of which are smaller than the diameter of the control slide 26 and guide bore 25, respectively. Both the first connecting conduit 20 and the second connecting conduit 21 intersect the guide bore 25; whenever the first restriction 36 at least partly covers the first connecting conduit 20 intersecting the guide bore 25, a flow through the first connecting conduit 20 is possible, while whenever the second restriction 37 at least partly covers the second connecting conduit 21 intersecting the guide bore 25, a flow through the second connecting conduit 21 is possible. In other words, with its restrictions 36, 37, the control slide 26 functions like a throttle; a first throttle cross section 41 is formed when the first connecting conduit 20 is covered by the first restriction 36, and a second throttle cross section 42 is formed when the second connecting conduit 21 is covered by the second restriction 37. The size of the throttle cross sections 41, 42 depends on the location of the control slide 26 within the guide bore 25.

Discharging into the portion of the guide bore 25 provided with the groove 32 is a control line 44, which over a portion of its length extends axially inside the piston rod 8 and which is connected to a valve device 46, embodied as a 3/3-way valve, that is secured to the vehicle body 1. The valve device 46 can be switched into three positions as a function of signals from an electronic control unit 47. In a first position, the control line 44 communicates with a source of pressure medium, which for instance comprises a compression pump 51 and a reservoir 52; in a second position, the control line 44 is blocked; and in a third position, the control line 44 is relieved of pressure. The electronic control unit 47 has one input for an electrical signal of a force transducer 54, which detects the longitudinal force acting upon the shock absorber 4.

The position of the control slide 26 inside the guide bore 25, which affects the magnitude and the type of the damping, depends on the pressures in the control line 44 and in the second work chamber 16 respectively acting on the face ends of the control slide 26. If the pressure in the second work chamber 16 exceeds the control pressure in the control line 44, then the control slide 26 is deflected upward, and vice versa. The gas volume 11 is dimensioned generously enough that the pressure in the second work chamber 16 undergoes only slight fluctuations as the shock absorber 4 moves in and out.

The mode of operation of the damping device will now be explained, referring to the situations illustrated in FIGS. 2-5.

Figure 2:
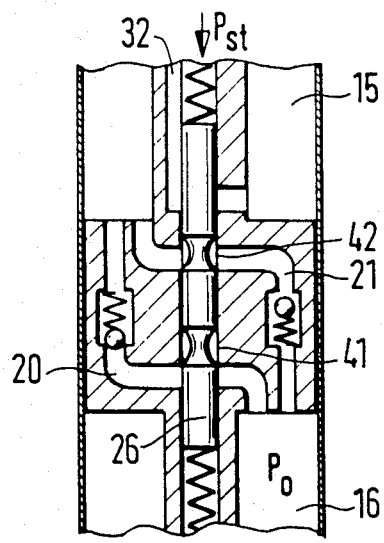
FIGS. 2-5 show details of the shock absorber of FIG. 1, for various operating ranges of the damping device.

In the case shown in FIG. 2, the control pressure $p_{st}$ in the control line 44 is lower than the pressure $p_0$ in the second work chamber 16; as a result, the control slide 26 moves slightly upward, toward the first work chamber 15. This enlarges the second throttle cross section 42 and reduces the size of the first throttle cross section 41, which results in an asymmetrical damper characteristic curve, since damping is more forceful in the compression stage than in the tension stage.

Figure 3:
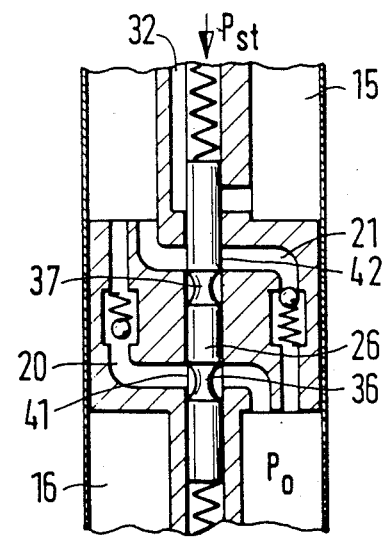

The situation shown in FIG. 3 is the reverse: The control pressure $p_{st}$ in the control line 44 is adjusted, by appropriate actuation of the valve device 46, such that it is higher than the pressure $p_0$ in the second work chamber 16. The control slide is deflected slightly downward, which enlarges the first throttle cross section 41 and makes the second throttle cross section 42 smaller. The damper characteristic curve is once again asymmetrical, but this time the tension stage then functions with high damping while the compression stage functions with low damping.

Figure 4:
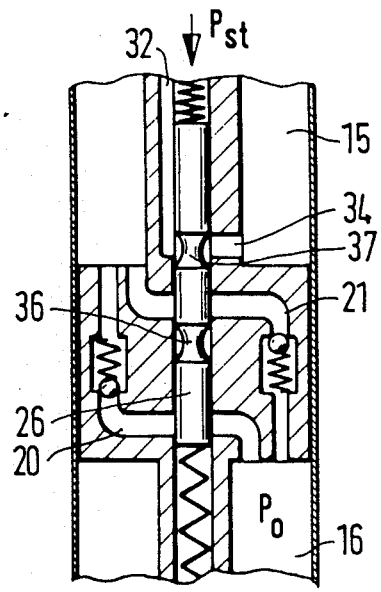

In the cases shown in FIGS. 2 and 3, the shock absorber 4 functions as a passive shock absorber; that is, the function and magnitude of the damping depend on the size of the throttle cross sections 41, 42 through which there is a flow. The situations illustrated in FIGS. 4 and 5 are different, where the shock absorber functions as an active adjuster:

If with suitable actuation of the valve device 46, the control pressure $p_{st}$ in the control line 44 is very much less than the pressure $p_0$ in the second work chamber, then the control slide 26 is deflected into its highest position, causing the groove 32 to communicate, via the second restriction 37, with the connecting opening 34. This leads to an escape of damping fluid from the first work chamber 15, via the connecting opening 34, the second restriction 37, the groove 32 and the control line 44. The resultant pressure drop between the pressures in the second work chamber 16 and in the first work chamber 15 leads to a movement of the damping piston 7 in the direction of a reduction in size of the first work chamber 15. The shock absorber functions as an active tension stage; the piston motion and force have opposite signs (+ or −), and the connecting conduits 20, 21 remain closed.

Figure 5:
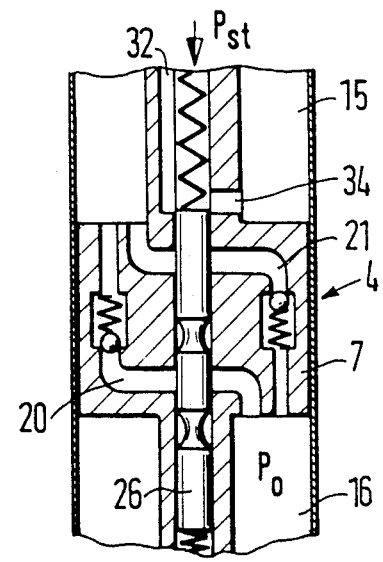

FIG. 5, contrarily, shows the shock absorber in its active compression stage. By suitable activation of the valve device 46, a control pressure $p_{st}$ that is substantially higher than the pressure $p_0$ in the second work chamber 16 is fed into the control line 44, which causes the control slide 26 to be lowered far downward and uncovers the connecting opening 34. Since the control pressure $p_{st}$ is higher than the pressure in the first work chamber 15, damping fluid flows via the connecting opening 34 into the first work chamber 15, causing the damping piston 7 to be actuated in the direction of an enlargement of the first work chamber 15. The shock absorber 4 functions as a compression stage; the piston movement and force have opposite signs; and the connecting conduits 20, 21 remain closed.

It can be appreciated that by suitable actuation of the valve device 46 by signals of the electronic control unit 47, the control pressure $p_{st}$ can be adjusted in such a way that passive or active damping is undertaken selectively. Since the active damping serves solely to damp lesser movements having a higher frictional component, the quantities of damping fluid that must be delivered to and removed from the connecting opening 34 in the case of active damping tend to be low, so that the components necessary for regulating the control pressure can be made smaller and lighter in weight than would be necessary in a fully active damping.

At very low piston speeds in the shock absorber, the damping device functions like an active damping system, with all its advantages, especially on a good roadway. At higher piston speeds, which lead to forces above the friction limit, the damping device functions as a passive, controllable damping system in accordance with the operating ranges shown in FIGS. 2 and 3. The damper characteristic curve may be either asymmetrical, or, as in the position of the control slide 26 shown in FIG. 1, symmetrical.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A damping device including a hydraulic shock absorber, comprising a jacket tube, a damping piston in said jacket tube that forms first and second work chambers within said jacket tube on opposite sides of said damping piston, at least one throttle cross section disposed in said damping piston between said first and second work chambers to regulate fluid flow therebetween, the size of said at least one throttle cross section being variable by means of a control device, said control device being acted upon by a hydraulic control pressure prevailing in a control line related to said control device and being controlled by a control valve means, said control device (26) being actuatable to place said control line (44) in hydraulic communication with one of said first and second work chambers (15, 16).

2. A damping device as defined by claim 1, in which both at the highest attainable control pressure and the lowest attainable control pressure in said control line, said control line (44) is controlled by said control device and is in hydraulic communication with said first work chamber (15) of said shock absorber.

3. A damping device as defined by claim 2, in which the control device (26) is acted upon on one end by the hydraulic control pressure prevailing in the control line (44) and on the other end by a pressure prevailing in one of said first and second work chambers (15, 16).

4. A damping device as defined by claim 3, in which a spring (28a, 28b) engages a respective end of the control device (26) and exerts end force thereon.

5. A damping device as defined by claim 4, in which the control device (26) comprises an axially movable control slide.

6. A damping device as defined by claim 1, in which two throttle cross sections (41, 42) are provided in said control device (26), each throttle cross section allowing a flow through it in only one direction.

7. A damping device as defined by claim 6, in which the size of the throttle cross sections (41, 42) can be varied asymmetrically by actuation of the control device (26).

8. A damping device as defined by claim 1, wherein the control valve means comprises a valve device (46) which is provided and switched as a function of control signals from a control unit (47) to adjust the hydraulic control pressure in the control line (44).

* * * * *